Patented Jan. 12, 1954

2,666,041

UNITED STATES PATENT OFFICE 2,666,041

SILICONE RUBBERS WITH IMPROVED COMPRESSION SET

Charles W. Pfeifer, Troy, N. Y., assignor to General Electric Company, a corporation of New York No Drawing. Application April 3, 1952,
Serial No. 280,369

24 Claims. (Cl. 260—37)

This invention relates to modified silicone compositions. More particularly, the invention is concerned with compositions of matter comprising (1) an organopolysiloxane convertible, e. g., by heat, to the solid elastic state, and (2) from 0.25 to 10 percent, by weight, based on the weight of the organopolysiloxane, of an additive selected from the class consisting of quinones, naphthoquinones, alkylated quinones, halogenated quinones, alkylated naphthoquinones, halogenated naphthoquinones, and hydrocarbon monoethers of hydroquinone, the cured articles derived from said mixture of ingredients having improved compression set at elevated temperatures over the same cured compositions in which the aforesaid additive is omitted.

One of the objects of this invention is to improve the oil resistance and compression set of silicone rubbers.

Another object of the invention is to permit the manufacture of silicone rubber gaskets which can be employed at elevated temperatures without undue permanent set at these temperatures.

A still further object of the invention is to obtain silicone rubbers of low compression set using as additives for that purpose compositions requiring reduced processing precautions.

Silicone rubbers in the cured substantially infusible and insoluble state have found eminent use in many applications where continued exposure at elevated temperatures without undue deterioration is a requirement. It has been found that although silicone rubbers can resist high temperatures for long periods of time, nevertheless, if the silicone rubber is maintained in a compressed state at these elevated temperatures, they become permanently deformed when the pressure is released. Although the recovery is partial, in many applications, particularly in gasketing applications, it is highly desirable that this permanent deformation be reduced to a minimum in order to obtain the best sealing effects.

U. S. Patent 2,448,530, issued September 7, 1948, and assigned to the same assignee as the present invention, discloses the use of mercury, oxides of mercury and salts of mercury as additives for incorporation in the silicone rubber prior to vulcanization thereof for the purpose of improving the compression set of the cured or vulcanized silicone rubber. Although the mercury and the mercury compounds are quite effective in improving the compression set, because of the chemical nature of such compositions, extreme care must be taken in using these materials because of possible toxic effects.

I have now discovered that unexpectedly a new class of materials are also effective in improving the compression set of the vulcanized silicone rubber and that these additives which are used for this purpose do not require any particular care or precaution, since they have scarcely any handling toxicity, and can be used with a minimum of precaution. The materials which I have found are eminently suitable for improving the compression set are the specific class of additives which have been mentioned above. The fact that these particular types of additives (for brevity hereinafter referred to as "additives") were effective for the purpose was entirely unexpected and in no way could have been predicted since compositions which are similar in structure, as, for example, quinazarin, hydroquinone, and anthraquinone, when used as additives in the same manner had little, if any, effect and in many instances had a detrimental effect, as far as the compression set was concerned.

The amounts of these additives which I may employ in the practice of the invention may be varied, depending on such conditions as the type of vulcanizable organopolysiloxane employed, the kind of filler used in making the silicone rubber, the specific additive employed, the application for which the vulcanized silicone rubber is intended, etc. Generally, I may employ on a weight basis, based on the weight of the convertible organopolysiloxane, from 0.25 to 10 percent, by weight, of the aforesaid additive, preferably from about 1 to 7 percent of additive.

The convertible silicone compositions, which may be highly viscous masses or gummy, elastic solids, depending on the state of condensation, the condensing agent employed, the starting organopolysiloxane used to make the convertible organopolysiloxane, etc., will hereinafter be referred to as "convertible organopolysiloxane" or more specifically as "convertible methyl polysiloxane." Although convertible organopolysiloxanes with which the present invention is concerned are well known, for purposes of showing persons skilled in the art the various convertible organopolysiloxanes which may be employed in the practice of the present invention, attention is directed to the convertible compositions disclosed and claimed in Agens Patent 2,448,756, issued September 7, 1948, Sprung et al. Patent 2,448,556, issued September 7, 1948, Sprung Patent 2,484,595, issued October 11, 1949, Krieble et al. Patent 2,457,688, issued December 28, 1948, Hyde Patent 2,490,357, issued December 5, 1949, Marsden Patent 2,521,528, issued September 5, 1950, and Warrick Patent 2,541,137, issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to silicon atoms by carbon-silicon linkages, may be employed without departing from the scope of the invention. The particular convertible organopolysiloxane used is not critical and may be any one of those described in the foregoing patents which are generally obtained by condensation of a liquid organopolysiloxane containing an average of from about 1.95, preferably from about 1.98, to about 2.05 organic groups per silicon atom. The usual condensing agents which may be employed and which are well known in the art for that purpose, may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, up to 2 mol percent copolymerized monoorganosiloxane, for example, copolymerized monomethylsiloxane. Generally, I prefer to use as the starting liquid organopolysiloxane from which the convertible, for example, heat-convertible organopolysiloxane, is prepared, one which contains about 1.999 to 2.01, inclusive, organic groups, for example, methyl groups per silicon atom and where more than about 90 percent, preferably 95 percent, of the silicon atoms in the polysiloxane contain two silicon-bonded alkyl groups.

The starting organopolysiloxanes used to make the convertible organopolysiloxane by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula R$_2$SiO where R is preferably a radical of the group consisting of methyl and phenyl radicals. At least 90 percent of the total number of R groups are preferably methyl radicals. The polysiloxane may be one in which all of the siloxane units are (CH$_3$)$_2$SiO or the siloxane may be a copolymer of dimethylsiloxane and a minor amount (e. g., from 1 to 20 mol percent) of any of the following units, alone or in combination therewith: C$_6$H$_5$(CH$_3$)SiO and (C$_6$H$_5$)$_2$SiO.

A small amount of a cure accelerator, for instance, benzoyl peroxide, tertiary butyl perbenzoate, zirconyl nitrate, etc., may be incorporated in the convertible organopolysiloxane for the purpose of accelerating its cure as is more particularly described in various patents calling for the use of these materials as cure accelerators for silicone rubber. The cure accelerator functions to yield cured products having better properties, for instance, improved elasticity, tensile strength, and tear resistance than is obtained by curing a similar gum composition or convertible organopolysiloxane containing no cure accelerator. The amount of cure accelerator which may be used may be varied, for example, from about 0.1 to about 8 percent or more preferably from about 1 to 4 percent by weight of the cure accelerator, based on the weight of the convertible organopolysiloxane.

The convertible organopolysiloxane may be compounded on ordinary rubber compounding differential rolls, with various fillers, for example, silica, silica aerogel, titanium dioxide, calcium silicate, ferric oxide, chromic oxide, cadmium sulfide, asbestos, glass fibers, calcium carbonate, carbon black, lithopone, talc, etc., and molded, extruded or otherwise shaped as by heating under pressure to form products having physical characteristics, e. g., elasticity, compressibility, etc., similar to those of natural rubber and other known synthetic rubbers.

The elastomers comprising the cured organopolysiloxanes of the present invention are particularly characterized by their improved compression set characteristics and greater thermal stability as compared with silicone rubbers similarly made but having none of the quinoids described above incorporated therein. Other properties, for instance, hardness, tensile strength, elongation, are much the same as those of the cured silicone rubber compositions from which the specific quinoids mentioned above are omitted.

In order that those skilled in the art may better understand how the present invention may be practiced, the following examples are given by way of illustration and not by way of limitation. All parts are by weight.

EXAMPLE 1

A highly viscous convertible organopolysiloxane, specifically a polymeric dimethylsiloxane, substantially non-flowable at room temperature, was prepared by condensing at a temperature of about 150° C. for about 6 hours octamethylcyclotetrasiloxane with about 0.01 percent, by weight, thereof potassium hydroxide. This polymer was soluble in benzene and had slight flow at room temperature. This convertible polymeric dimethylsiloxane, which for brevity will be referred to hereinafter as "polydimethylsiloxane," was then mixed on rubber compounding differential rolls with diatomaceous earth (silica), silica aerogel (specifically Santocel C manufactured by Monsanto Chemical Company) which had been treated with an azeotropic mixture of trimethylchlorosilane and silicon tetrachloride and thereafter washed to remove the formed HCl which resulted from hydrolysis of the chlorosilanes on the surface of the silica aerogel particles, and benzoyl peroxide. There were also incorporated in this formulation varying amounts of 2,5-ditertiarybutyl quinone having the formula

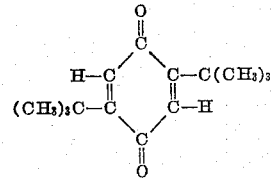

A control was also prepared in which the 2,5-ditertiarybutyl quinone was omitted.

The mixtures thus obtained were molded in a closed mold in the form of flat sheets (from which test specimens could be cut) at about 130° C. for about 50 minutes at a pressure of approximately 500 p. s. i. Thereafter the samples were removed from the press and further heat-treated at a temperature of about 250° C. for about 24 hours in an air-circulating oven to insure essentially complete cure of the silicone rubber. The formulation employed in making the various samples as well as the compression set of the cured materials are disclosed in the following Table I. The compression set characteristics which are given in Table I and elsewhere in the present description unless otherwise specified were determined by a modification of ASTM D-395-49T.

For the compression set tests, discs were cut from the molded and heat-treated sheets described above. These discs were superposed upon one another until a cylinder ½ inch high was obtained. This cylinder, which for brevity will hereinafter be referred to as a "plug," was compressed to 70 percent of its original thickness between steel plates and was then heated while under this compression at about 120° C. for 70 hours, and then was cooled to room temperature. The pressure was relieved and the thickness of the resulting plug measured 10 minutes thereafter. The figures given in Table I show the compression set of the plugs as a result of the treatment. A 100 percent compression set would indicate no recovery, while a zero compression set would mean that the plug had returned to its original thickness after release of pressure.

*Table I*

| Ingredients—Parts | Sample number | | | | | | |
|---|---|---|---|---|---|---|---|
| | 1 | 2 | 3 | 4 | 5 | 6 | 7 |
| Polydimethylsiloxane | 100 | 100 | 100 | 100 | 100 | 100 | 100 |
| Diatomaceous earth | 45 | 45 | 45 | 45 | 45 | 45 | 45 |
| Treated silica aerogel | 20 | 20 | 20 | 20 | 20 | 20 | 20 |
| Benzoyl peroxide | 1.5 | 1.5 | 1.5 | 1.5 | 1.5 | 1.5 | 1.5 |
| 2,5-ditertiary butyl quinone | (1) | 0.1 | 0.3 | 0.5 | 1.0 | 2.0 | 5.0 |
| Percent compression set | 47.5 | 30.1 | 29.4 | 28.8 | 17.1 | 12.7 | 12.9 |

[1] Control.

EXAMPLE 2

In this example, a heat-convertible dimethylsiloxane was prepared by condensing a dimethyl silicone oil containing 0.4 mol percent intercondensed monomethylsiloxane (obtained by hydrolyzing dimethyldichlorosilane containing 0.4 mol percent methyltrichlorosilane) by heating the aforesaid silicone oil with about 0.01 percent, by weight, thereof potassium hydroxide in the same manner as that employed for making the heat-convertible polydimethylsiloxane described in Example 1. This highly viscous substantially non-flowable material was then compounded on rubber compounding rolls in the same manner as was done in Example 1, in one case, with diatomaceous earth as a filler, and in another case with a mixture of titanium dioxide and zinc oxide as a filler together with benzoyl peroxide, and 2,5-ditertiary-butyl quinone. Sheets were molded similarly as was done in Example 1 and thereafter further heated in an oven for 24 hours at 250° C. Thereafter, some of the sheets were tested for hardness, tensile strength and elongation, while the plugs formed from the sheets (similarly as described in Example 1) were subjected to a compression set test in the same manner as described in Example 1, except that in one case the test for compression set was made at about 150° C. for 70 hours (Sample Nos. 8 and 9) and in the other case the test for compression set was made for 70 hours at about 120° C. (Sample Nos. 10 and 11). Table II shows the formulations employed as well as the results of the physical tests conducted.

*Table II*

| Ingredients—Parts: | Sample number | | | |
|---|---|---|---|---|
| | 8 | 9 | 10 | 11 |
| Polydimethylsiloxane | 100 | 100 | 100 | 100 |
| Diatomaceous earth | 150 | 150 | | |
| Titanium dioxide | | | 100 | 100 |
| Zinc oxide | | | 100 | 100 |
| Benzoyl peroxide | 1.5 | 1.5 | 2.0 | 2.0 |
| 2,5-ditertiarybutyl quinone | | 1.5 | | 2.0 |
| Properties: | | | | |
| Percent compression set | 84.3 | 15.2 | 32.0 | 18.5 |
| Tensile p. s. i. | 770 | 770 | 340 | 340 |
| Percent elongation | 90 | 90 | 140 | 120 |

EXAMPLE 3

In this example, a heat-convertible organopolysiloxane specifically a polydimethylsiloxane containing about 0.40 mol percent copolymerized monomethylsiloxane was prepared by first hydrolyzing dimethyldichlorosilane containing 0.40 mol percent methyltrichlorosilane to an oil and thereafter condensing this material with about 0.1 percent by weight thereof partially hydrated ferric chloride until a solid elastic product substantially insoluble in benzene was obtained. Molding compositions were prepared from this gum with various fillers, benzoyl peroxide, and 2,5-ditertiary-butyl quinone, as was done in the previous examples, and the molding compositions thereafter molded and further heat-cured for 24 hours at 250° C. The compression set tests were conducted on the plugs while the latter were compressed to about 70 percent of their size for 70 hours at about 120° C. Table III shows the various formulations used in making the molding compositions as well as the results of compression sets conducted on the molded heat-treated samples.

*Table III*

| Ingredients—Parts | Sample number | | | | | | | |
|---|---|---|---|---|---|---|---|---|
| | 12 | 13 | 14 | 15 | 16 | 17 | 18 | 19 |
| Polydimethylsiloxane | 100 | 100 | 100 | 100 | 100 | 100 | 100 | 100 |
| Diatomaceous earth | 125 | 125 | 62.5 | 62.5 | 150 | 150 | 62.5 | 62.5 |
| Titanium dioxide | | | 87.5 | 87.5 | | | | |
| Red iron oxide | | | | | | | 100 | 100 |
| Benzoyl peroxide | 1.3 | 1.3 | 1.5 | 1.5 | 1.5 | 1.5 | 2.0 | 2.0 |
| 2,5-ditertiary-butyl quinone | 0 | 2.0 | 0 | 2.0 | 0 | 2.0 | 0 | 2.0 |
| Percent compression set | 32.4 | 11.7 | 29.0 | 18.5 | 48.6 | 15.4 | 33.3 | 10.4 |

EXAMPLE 4

The polydimethylsiloxane described in Example 2 was mixed with diatomaceous earth, benzoyl peroxide, and varying amounts of 2,5-ditertiary-butyl quinone. As a control, one formulation was made in which the quinone was omitted. Thereafter each formulation was compounded on rubber compounding rolls and molded in the form of sheets in the same manner as described in Example 1. After the molding cycle described in Example 1, the sheets were further heated for 24 hours at 250° C. in an air-circulating oven. The sheets were then tested for tensile strength, percent elongation, and compression set properties. The plugs made from the sheets were tested for their compression set properties in two ways. In one manner (compression set A) the compression set was measured after 70 hours at about 120° C. and in the second case (compression set B) the compression set was measured after 70 hours at 150° C. at a 30 percent deflection (i. e., compressed to 70 percent of the height of the cylinder). The accompanying Table IV shows the formulations employed as well as the various results on the physical properties of the molded samples.

*Table IV*

|  | Sample Number | | |
|---|---|---|---|
|  | 20 | 21 | 22 |
| Ingredients—Parts: | | | |
| Polydimethylsiloxane | 100 | 100 | 100 |
| Diatomaceous earth | 150 | 150 | 150 |
| Benzoyl peroxide | 1.5 | 1.5 | 1.5 |
| 2,5-ditertiarybutyl quinone |  | 1.5 | 1.25 |
| Physical properties: | | | |
| Percent compression set A | 37.4 | 10.7 | 11.3 |
| Percent compression set B | 49.6 | 13.9 | 15.5 |
| Tensile, p. s. i. | 660 | 590 | 620 |
| Percent elongation | 95 | 100 | 100 |

I have found that the incorporation of the above-mentioned class of additives in silicone rubber in addition to improving the compression set thereof also helps in reducing the oil-swelling characteristics of the silicone rubber. The following example illustrates the improvement possible by the use of the quinones for this purpose.

EXAMPLE 5

To 100 parts of the polydimethylsiloxane described in Example 1 was added 40 parts diatomaceous earth, 1.5 parts benzoyl peroxide, and 1.0 part 2,5-ditertiarybutyl quinone. A control formulation was also prepared in which the quinone was omitted. Each sample was then molded in the form of sheets using the same procedure and cycle as described in Example 1, and thereafter the samples were further heat-treated for 24 hours at 250° C. Each sample was then immersed in an oil designated as ASTM Test Oil #1 for 70 hours at about 177° C. and thereafter removed and the volume increase in each compound measured. The compound containing the 2,5-ditertiarybutyl quinone had increased in volume about 4.6 percent. The compound from which the 2,5-ditertiarybutyl quinone was omitted had, on the other hand, increased in volume 8.0 percent. This illustrates one of the additional improvements possible by means of the practice of my invention.

EXAMPLE 6

This example illustrates the effect of varying the amount of the additive, for example, 2,5-ditertiarybutyl quinone, in my invention. The basic formulation comprised 100 parts of the polydimethylsiloxane, 125 parts diatomaceous earth and 1.33 parts benzoyl peroxide. The varying amounts of 2,5-ditertiarybutyl quinone employed are more particularly described in Table V below. This table also shows the results of the tensile strength and percent elongation of each sample in addition to the compression set figures. The molding cycle of the sheets used for the physical tests comprised 15 minutes in a mold at 115° C. at a pressure of about 500 p. s. i. and further heating for 24 hours in an air-circulating oven at 250° C. The compression set data was obtained by means of ASTM D–395–46T Method B (30 percent compression at 121° C. for 70 hours). It will be noted that Table V contains two controls since it was necessary to use two different batches of polydimethylsiloxane.

*Table V*

| Parts 2,5-ditertiarybutyl quinone | Percent compression set | Tensile p. s. i. | Percent elongation |
|---|---|---|---|
| [1] 0.0 | 39.6 | 789 | 70 |
| 0.25 | 33.5 | 825 | 70 |
| 0.50 | 28.9 | 700 | 60 |
| 1.0 | 21.4 | 660 | 70 |
| 1.5 | 15.8 | 570 | 70 |
| 2.0 | 13.0 | 580 | 100 |
| 2.5 | 11.8 | 530 | 90 |
| 3.5 | 9.4 | 475 | 90 |
| 4.0 | 11.6 | 490 | 100 |
| [1] 0.0 | 35.9 | 645 | 50 |
| 2.0 | 11.8 | 414 | 80 |
| 4.5 | 17.6 | 515 | 90 |
| 5.0 | 15.1 | 510 | 100 |
| 6.5 | 14.6 | 530 | 100 |
| 7.5 | 11.7 | 360 | 90 |
| 8.5 | 14.1 | 400 | 110 |
| 9.0 | 19.5 | 475 | 90 |
| 9.5 | 13.3 | 450 | 80 |
| 10.0 | 13.5 | 355 | 90 |

[1] Control.

EXAMPLE 7

In this example, various additives were employed in combination with the polydimethylsiloxane described in Example 3. More particularly, 100 parts of the polydimethylsiloxane described in Example 3 was mixed with 150 parts of diatomaceous earth and 1.5 parts of benzoyl peroxide. This composition was then compounded in the usual manner as described above with varying amounts of the different quinoid compositions described below. Thereafter sheets were molded for 15 minutes in a press at 115° C. at a pressure of about 500 p. s. i. and further oven-cured in an air circulating oven for 24 hours at 250° C. Each sample was then tested for compression set using ASTM D–395–46T Method B in which there is 25 percent compression at 177° C. for 70 hours. The following Table VI describes the various quinones employed and the amounts of such quinones together with the physical properties obtained on the samples.

The formula for the hydroquinone monomethyl ether employed in the foregoing Example 7 is as follows:

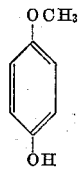

*Table VI*

| Additive used | Parts of each additive | Percent compression set |
|---|---|---|
| Monomethylether of hydroquinone | 0 | 76.7 |
|  | 1.0 | 63.0 |
|  | [a]1.0 | 49.0 |
|  | 2.0 | 39.6 |
|  | [b]2.0 | 36.8 |
|  | [b]4.0 | 59.1 |
| Chloranil | 0 | 77.0 |
|  | 0.5 | 67.7 |
| Quinone | 0 | 61.0 |
|  | 2.0 | 52.2 |
| 2,6-dichloroquinone | 0 | 76.1 |
|  | 0.5 | 71.3 |
|  | 1.0 | 53.2 |
| 1,4-naphthoquinone | 0 | 77.1 |
|  | 0.5 | 52.5 |
|  | 1.0 | 39.5 |

[a] This composition contained 1 added part benzoyl peroxide.
[b] This composition contained 2 added parts benzoyl peroxide.

It will, of course, be apparent to those skilled in the art that in addition to the convertible organopolysiloxanes employed in the foregoing examples, other organopolysiloxanes, many examples of which have been given previously, can be used without departing from the scope of the invention. Additionally, other types of vulcanization accelerators or cure accelerators besides the benzoyl peroxide described above may also be employed. Various other fillers may be used and obviously the amount of filler may be varied considerably depending, for example, on the particular filler employed, its particle size, and the specific convertible organopolysiloxane used, the purpose for which the finished produce is to be used, etc. Thus, filled organopolysiloxanes may be produced containing, for instance, from about 20 to 150 percent, by weight, filler based on the entire weight of filled material. Generally, the filler on a weight basis may be employed in an amount equal to from about 0.15 to 3 parts of filler per part of convertible organopolysiloxane, for example, heat-convertible polydimethylsiloxane. When one employs, for instance, silica aerogel as the filler, the amount of such filler which may properly and advantageously be used with the convertible organopolysiloxane is much less than usual fillers, especially when the benzene-soluble diorganosiloxanes described above having slight flow at room temperature are used. In such instances the amount of silica aerogel which may be tolerated in the filled composition is generally below 50 to 60 parts of the silica aerogel filler per 100 parts of the convertible organopolysiloxane.

Obviously, the amount of the specific additive used in the practice of the present invention may also be varied. Generally, I have found that no particular advantage is derived from incorporating amounts of the additive in excess of 10 percent. The use of additives above this amount may undesirably affect the quality of the silicone rubber. For optimum results, the additive is incorporated shortly before the formulation is to be molded.

Finally, it will also be apparent to those skilled in the art that other quinones coming within the scope of the description of quinones found above may also be employed. Thus, other quinones, such as 1,2-quinone, 1,2-naphthoquinone; other alkylated quinones and naphthyl quinones, for instance, monoalkylated and polyalkylated quinones, for example, tertiary butyl quinone, ethyl quinone, 2,6-ditertiary butyl quinone, 2,3-ditertiary butyl naphthyl quinone, etc., as well as other quinones containing from 1 to 4 alkyl groups attached directly to the quinone nucleus; other halogenated quinones and naphthoquinones, e. g., trichloroquinone, tetrachloronaphthoquinone, etc., other monoethers of hydroquinone, e. g., hydrocarbon ethers of hydroquinone such as, for instance, monobenzyl ether of hydroquinone, monobutyl ether of hydroquinone, monopropyl ether of hydroquinone, monophenyl ether of hydroquinone, etc., may be used in place of those described above. Generally, I prefer to employ an alkylated quinone, for instance, the 2,5-ditertiarybutyl quinone.

The products of this invention are useful in applications such as, for instance, gaskets, tubing, electrical insulation (e. g., as conductor insulation, etc.), shock absorbers, etc. They are particularly suitable for use as gaskets in applications involving high temperature compression conditions, especially those conditions where they may be subjected to the effect of halogenated hydrocarbons as insulating media, namely, in the manufacture of capacitors. Because of their resistance to heat they have value as materials for use in applications where natural or other synthetic rubbers fail owing to the deleterious effect of heat. Elastomers produced by the practice of my invention have the additional property of retaining their flexibility at low temperature, e. g., temperatures as low as −60° C.

What I claim as new and desire to secure by Letters Patent of the United States is:

1. A curable composition of matter comprising (1) an organopolysiloxane convertible to the cured, solid, elastic state, the organic radicals of the aforesaid organopolysiloxane being hydrocarbon radicals attached to silicon by carbon-silicon linkages, and (2) from 0.25 to 10 percent, by weight, of an additive selected from the class consisting of quinones, naphthoquinones, alkylated quinones, halogenated quinones, alkylated naphthoquinones, halogenated naphthoquinones, and hydrocarbon monoethers of hydroquinone, the aforesaid weight of the additive being based on the weight of the organopolysiloxane.

2. A curable composition comprising (1) a polydimethylsiloxane convertible to the cured, solid, elastic state and (2) 0.25 to 10 percent, by weight, based on the weight of the polydimethylsiloxane, of an additive selected from the class consisting of quinones, naphthoquinones, alkylated quinones, halogenated quinones, alkylated naphthoquinones, halogenated naphthoquinones, and hydrocarbon monoethers of hydroquinone.

3. A curable composition comprising (1) an organopolysiloxane convertible by heat to the cured, solid, elastic state, the aforesaid organopolysiloxane comprising essentially a diorganosiloxane of the recurring structural unit RRSiO in which R represents radicals, some of which may be unlike, selected from the class consisting of silicon-bonded monovalent methyl and aryl radicals and in which diorganosiloxane at least 75 percent of the total number of R groups are methyl radicals, and (2) from 0.25 to 10 percent, by weight, based on the weight of the diorganosiloxane, of an additive selected from the class consisting of quinones, naphthoquinones, alkylated quinones, halogenated quinones, alkylated naphthoquinones, halogenated naphthoquinones, and hydrocarbon monoethers of hydroquinones.

4. An elastomer comprising the heat-cured elastic product of claim 3.

5. A curable composition of matter comprising (1) a methylpolysiloxane convertible by heat to the cured, solid, elastic state and (2) from 0.25 to 10 percent, by weight, based on the weight of the methylpolysiloxane, of 2,5-ditertiarybutyl quinone.

6. A curable composition of matter comprising (1) a methylpolysiloxane convertible by heat to the cured, solid, elastic state and (2) from 0.25 to 10 percent, by weight, based on the weight of the methylpolysiloxane, of the monomethyl ether of hydroquinone.

7. A curable composition of matter comprising (1) a methylpolysiloxane convertible by heat to the cured, solid, elastic state and (2) from 0.25 to 10 percent, by weight, based on the weight of the methylpolysiloxane, of quinone.

8. A curable composition of matter comprising (1) a methylpolysiloxane convertible by heat to the cured, solid, elastic state and (2) from 0.25 to 10 percent, by weight, based on the weight of the methylpolysiloxane, of 2,6-dichloroquinone.

9. A curable composition of matter comprising (1) a methylpolysiloxane convertible by heat to the cured, solid, elastic state and (2) from 0.25 to 10 percent, by weight, based on the weight of the methylpolysiloxane, of 1,4-naphthoquinone.

10. A product comprising a cured, solid, elastic organopolysiloxane having incorporated therein prior to curing from 0.25 to 10 percent, by weight, based on the weight of the organopolysiloxane, of an additive for improving the compression set of the aforesaid organopolysiloxane, the organic groups of the aforesaid organopolysiloxane being hydrocarbon groups attached directly to silicon by carbon-silicon linkages, and the said additive being selected from the class consisting of quinones, naphthoquinones, alkylated quinones, halogenated quinones, alkylated naphthoquinones, halogenated naphthoquinones, and hydrocarbon monoethers of halogenated quinones.

11. A heat-curable elastic composition comprising (1) a methylpolysiloxane convertible by heat to the cured, solid, elastic state, (2) from 0.25 to 10 percent, by weight, of an additive selected from the class consisting of quinones, naphthoquinones, alkylated quinones, halogenated quinones, alkylated naphthoquinones, halogenated naphthoquinones and hydrocarbon monoethers of halogenated quinones.

12. An elastomer comprising the heat-cured elastic product of claim 11.

13. A curable composition of matter comprising (1) a methylpolysiloxane convertible by heat to the cured, solid, elastic state, (2) from 0.25 to 10 percent, by weight, to 2,5-ditertiarybutyl quinone, (3) from 0.1 to 4 percent, by weight, benzoyl peroxide, and (4) a filler comprising silica aerogel, the weights of (2) and (3) being based on the weight of the methylpolysiloxane.

14. A curable composition of matter comprising (1) a methylpolysiloxane convertible by heat to the cured, solid, elastic state, (2) from 0.25 to 10 percent, by weight, of the monomethyl ether of hydroquinone, (3) from 0.1 to 4 percent, by weight, benzoyl peroxide, and (4) a filler comprising silica aerogel, the weights of (2) and (3) being based on the weight of the methylpolysiloxane.

15. A curable composition of matter comprising (1) a methylpolysiloxane convertible by heat to the cured, solid, elastic state, (2) from 0.25 to 10 percent, by weight, quinone, (3) from 0.1 to 4 percent, by weight, benzoyl peroxide, and (4) a filler comprising silica aerogel, the weights of (2) and (3) being based on the weight of the methylpolysiloxane.

16. A curable composition of matter comprising (1) a methylpolysiloxane convertible by heat to the cured, solid, elastic state, (2) from 0.25 to 10 percent, by weight, 2,6-dichloroquinone, (3) from 0.1 to 4 percent, by weight, benzoyl peroxide, and (4) a filler comprising silica aerogel, the weights of (2) and (3) being based on the weight of the methylpolysiloxane.

17. A curable composition of matter comprising (1) a methylpolysiloxane convertible by heat to the cured, solid, elastic state, (2) from 0.25 to 10 percent, by weight, 1,4-naphthoquinone, (3) from 0.1 to 4 percent, by weight, benzoyl peroxide, and (4) a filler comprising silica aerogel, the weights of (2) and (3) being based on the weight of the methylpolysiloxane.

18. A product comprising the cured composition of claim 13.

19. A product comprising the cured composition of claim 14.

20. A product comprising the cured composition of claim 15.

21. A product comprising the cured composition of claim 16.

22. A product comprising the cured composition of claim 17.

23. The method which comprises (1) incorporating a cure accelerator and from 0.25 to 10 percent, by weight, of an additive selected from the class consisting of quinones, naphthoquinones, alkylated quinones, halogenated quinones, alkylated naphthoquinones, halogenated naphthoquinones and hydrocarbon monoethers of halogenated quinones, into a curable composition comprising an organopolysiloxane convertible by heat to the cured, solid, elastic state, the organic groups of the aforesaid organopolysiloxane being hydrocarbon groups attached to silicon by carbon-silicon linkages, and the said additive being capable of improving the compression set characteristics of the cured organopolysiloxane, and (2) curing the resulting composition under the influence of heat.

24. The method which comprises (1) incorporating, by weight, from 0.1 to 4 percent benzoyl peroxide and from 0.25 to 10 percent of an additive comprising 2,5-ditertiary-butyl quinone into a curable composition comprising a methylpolysiloxane containing an average of approximately two methyl groups per silicon atom, the aforesaid methylpolysiloxane being convertible by heat to the cured, solid, elastic state, and the said additive being capable of improving the compression set properties of the cured methylpolysiloxane, and (2) curing the resulting composition under the influence of heat.

CHARLES W. PFEIFER.

No references cited.